(12) United States Patent
Drinkard, Jr. et al.

(10) Patent No.: US 8,814,980 B2
(45) Date of Patent: Aug. 26, 2014

(54) METHOD OF RECOVERING METAL VALUES FROM NICKEL-CONTAINING ORES

(75) Inventors: William F. Drinkard, Jr., Charlotte, NC (US); Hans J. Woerner, Mt. Pleasant, NC (US)

(73) Assignee: Drinkard Metalox, Inc, Charlotte, NC (US)

( * ) Notice: Subject to any disclaimer, the term of this patent is extended or adjusted under 35 U.S.C. 154(b) by 347 days.

(21) Appl. No.: 13/200,782

(22) Filed: Sep. 30, 2011

(65) Prior Publication Data

US 2012/0073407 A1 Mar. 29, 2012

Related U.S. Application Data

(63) Continuation-in-part of application No. 12/451,233, filed as application No. PCT/US2008/005600 on May 1, 2008, now Pat. No. 8,038,767.

(60) Provisional application No. 60/927,391, filed on May 3, 2007.

(51) Int. Cl.
*C22B 23/00* (2006.01)
*C22B 3/00* (2006.01)

(52) U.S. Cl.
CPC ......... *C22B 23/0438* (2013.01); *C22B 23/0469* (2013.01)

USPC .............................................. 75/739; 75/742

(58) Field of Classification Search
USPC .................................................. 75/739, 743
See application file for complete search history.

(56) References Cited

U.S. PATENT DOCUMENTS 8,038,767 B2 * 10/2011 Drinkard, Jr. et al. .......... 75/743

OTHER PUBLICATIONS

Haynes, Ed. CRC Handbook of Chemistry and Physics. 94th edition. Internet Version 2014. pp. 4-10 and 4-23.*

* cited by examiner

*Primary Examiner* — George Wyszomierski
*Assistant Examiner* — Tima M McGuthry Banks
(74) *Attorney, Agent, or Firm* — Ralph H. Dougherty

(57) ABSTRACT

An improved method for processing of nickel-bearing ores, particularly saprolite and limonite, to recover the valuable minerals contained therein, comprising leaching the ore with nitric acid to form a slurry; separating the iron values by precipitation, removing the iron values; forming a liquid/solid residue in which nickel, cobalt and magnesium are in solution, and manganese and aluminum, when present, are solid residues in oxide form; conducting a liquid-solid separation and removing the solids; and recovering the nickel, cobalt, and manganese from the liquid-metal concentrate. The leachate is recovered and nitric acid from the leachate is recycled.

19 Claims, 1 Drawing Sheet

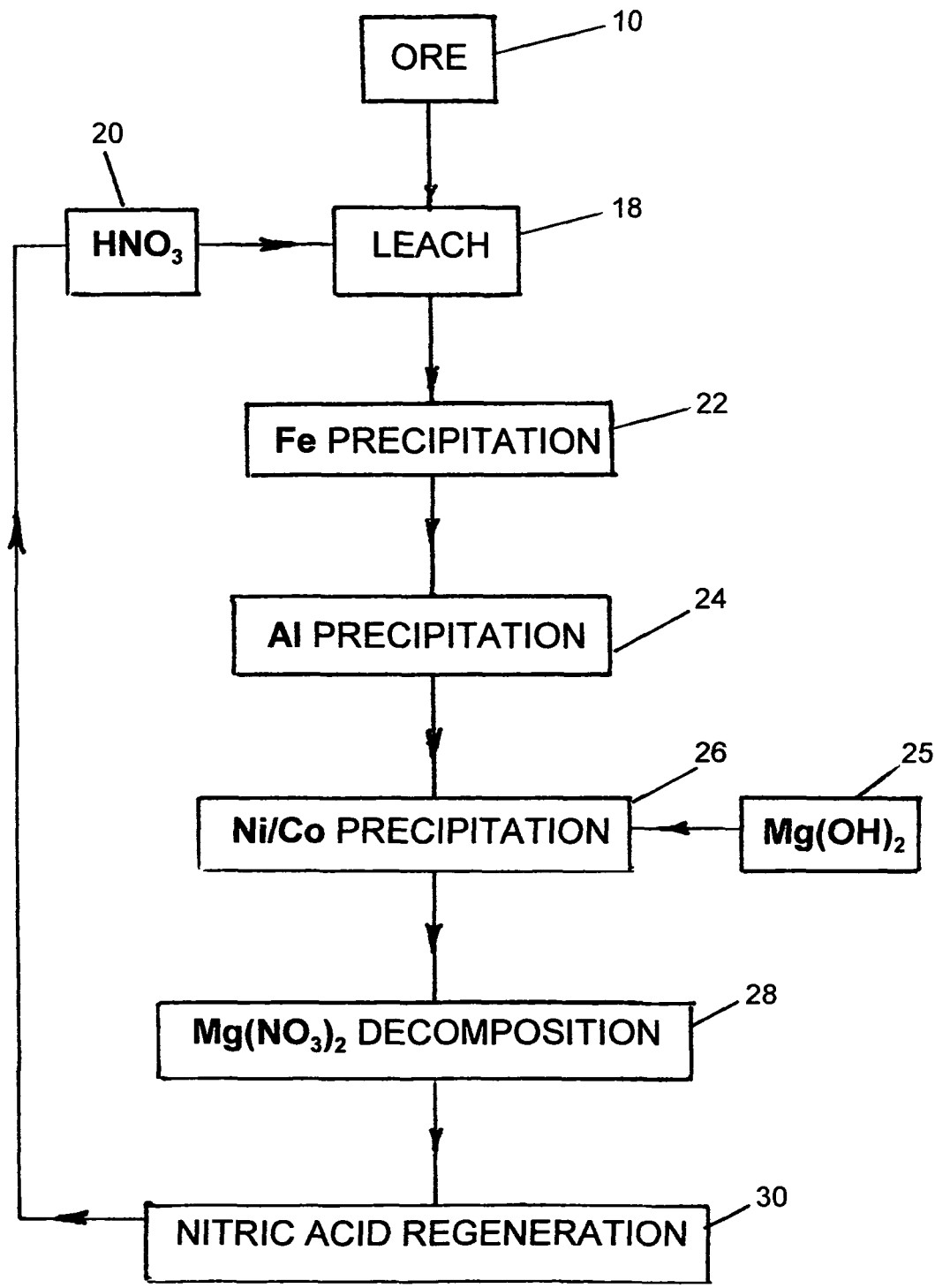

METHOD OF RECOVERING METAL VALUES FROM NICKEL-CONTAINING ORES

CROSS REFERENCE TO RELATED APPLICATIONS

This application is a continuation-in-part of U.S. patent application Ser. No. 12/451,233, filed Oct. 30, 2009, now U.S. Pat. No. 8,038,767, and claims the benefit of priority of PCT Application No. PCT/US2008/005600, filed on May 1, 2008, and U.S. Provisional Patent Application Ser. No. 60/927,391, filed on May 3, 2007.

FIELD OF THE INVENTION

The present invention relates to a method for processing of nickel-containing ores, particularly for recovering of nickel and other metals, and more particularly to methods for recovery of iron, nickel, cobalt, magnesium, aluminum, chromium, and other valuable constituents of saprolite and limonite ores.

BACKGROUND OF THE INVENTION

The compositions of ores vary extensively, even when taken from the same mining site. Limonite and saprolite ores usually contain iron, nickel, cobalt, magnesium, manganese, chromium, and/or aluminum. Known processes for treating high magnesium saprolite ores or high-iron limonite type ores are generally high cost processes, whereas the present invention is an improved, cost-effective process which can handle a full range of ores, including transitional ores. The term "ores" as used herein is intended to mean oxide and sulfide ores, metallurgical wastes, and metal-bearing materials, it being understood that metals can be combined with other elements.

SUMMARY OF THE INVENTION

The invention is a method for processing of nickel-bearing saprolite and limonite ores to recover the valuable minerals contained therein. The process acts on any oxide or sulfide ores, metallurgical wastes, and metal-bearing materials containing iron, nickel, cobalt, magnesium, and possibly aluminum, it being understood that in such materials, metals can be combined with other elements. The ores may be ground or comminuted, if desired, or may be blended with other metal-bearing materials. The ores are leached with nitric acid, then the iron is precipitated by thermal hydrolysis or pH balancing. Optionally, aluminum is recovered by precipitation or crystalline recovery. Magnesium hydroxide is added to the solution, and a pH balance is effected to form nickel and cobalt hydroxides which are recovered as precipitates.

Advantageously, the nitric acid for the leach is provided by the process described in U.S. Pat. No. 6,264,909, entitled Nitric Acid Production and Recycle, which issued on Jul. 24, 2001, and which is incorporated herein by reference.

The present invention is particularly useful for recovery of nickel, cobalt, aluminum, iron, chromium, manganese, and magnesium.

OBJECTS OF THE INVENTION

The principal object of the present invention is to provide an improved method of recovering nickel and cobalt from saprolite and limonite ores.

Another object of this invention is to provide a method of recovering metal values from ores, metallurgical wastes, and other metal-bearing materials.

Another object of the invention is to provide a method of producing nitrate salts, such as ammonium, sodium, potassium, calcium, or magnesium nitrates.

BRIEF DESCRIPTION OF THE DRAWING

The foregoing and other objects will become more readily apparent by referring to the following detailed description and the appended drawing in which:

FIG. 1 is a schematic flowsheet of the invented process in a basic form.

DETAILED DESCRIPTION

Referring now to the drawing, FIG. 1, the invented process in its basic form starts with run of the mine saprolite or limonite ores 10 or other metal bearing materials.

The ore 10 is leached with nitric acid ($HNO_3$) for a sufficient time to form a slurry. Although the ore may be crushed, it is not necessary to do so as the nitric acid will act efficiently regardless of the size of the ore particles. The ore is leached 18 with nitric acid 20 at a temperature of less than 160° C., generally from about 70° C. to 130° C., but preferably about 120° C. for a period of time of about 30 minutes to about 3 hours. The acid can be a 10 to 90% (weight percent) nitric acid solution, but is preferably about 30 to 67% nitric acid, and optimally is about a 45 to 55% acid solution.

The nitric acid 20 for the leaching process is preferably obtained from a nitric acid recycle process in accordance with U.S. Pat. No. 6,264,909, referred to above.

The temperature of the leach solution is raised by heating to a temperature in the range of about 125 to 200° C., preferably to about 165° C., to form a liquid/solid residue in which the nickel, cobalt and magnesium are in solution, and the iron, manganese, and aluminum are solid residues in oxide form. The heating is carried out in an enclosure from which the evolved gases (principally $NO_x$) are recovered for further treatment. The leaching and heating steps can be carried out in the same vessel, or in separate vessels.

Iron is precipitated at 22 as $Fe_2O_3.3H_2O$, either by thermal hydrolysis or pH balancing of the solution to effect the precipitation.

The slurry undergoes a solid-liquid separation, the gangue materials being removed as solids. The remaining liquid solution is heated, the iron being precipitated as $Fe_2O_3$, either by thermal hydrolysis or pH balancing of the solution to effect the precipitation.

The $Fe_2O_3$ is removed as a solid by liquid-solid separation (filtration), leaving a solution containing nickel and cobalt values, and, if was present in the ore or the material being treated, aluminum.

When aluminum is present, it is removed at 24 by thermal hydrolysis precipitation and separation by filtration or by centrifuge, leaving a nickel-cobalt solution.

The solution undergoes thermal hydrolysis, pH balance (pH shift), or solvent extraction to form $Ni(OH)_2$ and $Co(OH)_2$ in solid form which is removed as a precipitate, by filtration, at 26. A pH balance is preferably accomplished by mixing an alkaline earth hydroxide 25 such as $Mg(OH)_2$ with the nickel-cobalt solution to form $Ni(OH)_2$ and $Co(OH)_2$, salts. The preferable alkaline earth hydroxides are those of magnesium, calcium, and strontium. Alternatively, pH balance can be accomplished by mixing alkaline earth carbonates or oxides with the nickel-cobalt solution, or by mixing alkali metal hydroxides or carbonates with the nickel-cobalt solution. During or after this step, or alternatively, the nickel and cobalt values can be removed from solution as Ni/Co salts by solvent extraction, or as NiS and CoS salts by sulfide precipitation. Hydrogen sulfide, ammonium sulfide, sodium sulfide, and sodium hydrosulfide (NaSH) are the most common precipitating agents for sulfide precipitation The filtrate is concentrated, usually by multiple effect evaporation until the remaining $Mg(NO_3)_2$ is almost anhydrous. The magnesium nitrate is then thermally decomposed at 28 to form MgO, $HNO_3$ and $NO_x$, and the nitric acid and nitric oxides are recycled. The resulting MgO can be used elsewhere in the invented process.

The $NO_x$ containing gases are reformed at 30 into nitric acid utilizing the nitric recycle process described in U.S. Pat. No. 6,264,909.

Shifting of the pH of the solution is accomplished by adding or removing nitric acid, or by adding alkaline earths to the solution.

Precipitation of iron is usually accomplished at a pH of 2 to 3;

Precipitation of alumina is usually accomplished at a pH of 4-5;

Precipitation of nickel is usually accomplished at a pH of 6-7;

Precipitation of Manganese is usually accomplished at a pH of 8-9;

Precipitation of MgO is usually accomplished at a pH of 10-11;

Precipitation of Ca is usually accomplished at a pH of 12-13.

Precipitates are removed by filtration, or may be separated by other known methods such as centrifuging.

In any place throughout the process where nitric acid or oxide is removed, it may be recycled to the nitric acid recycle process for further use.

SUMMARY OF THE ACHIEVEMENT OF THE OBJECTS OF THE INVENTION

From the foregoing, it is readily apparent that we have invented an improved method of recovering nickel and cobalt from saprolite and limonite ores, and for recovering metal values from ores, metallurgical wastes, and other nickel-bearing materials, more economically than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A method of recovering metal values from ores containing iron, nickel, cobalt, and magnesium, comprising:
    a) leaching the ore with nitric acid for a sufficient time to form a slurry;
    b) separating any undissolved residue from the slurry to form a solution:
    c) precipitating the iron as $Fe_2O_3 \cdot 3H_2O$, and leaving a solution containing nickel and cobalt values;
    d) performing a step from the group consisting of: thermal hydrolysis, pH balance shift, and solvent extraction, to form $Ni(OH)_2$ and $Co(OH)_2$, or Ni/Co, salts in solid form, and removing the nickel and cobalt values as a precipitate;
    e) recovering nitric acid and $NO_x$ containing gases from the solution; and
    f) reforming the recovered $NO_x$ containing gases into nitric acid for further use.

2. A method according to claim 1 wherein the leaching is carried out at a temperature of 70° C. to 160° C. for a period of time of from about 30 minutes to about 3 hours.

3. A method according to claim 1 wherein the nitric acid in the leaching is a solution of 10 to 90 percent by weight nitric acid.

4. A method according to claim 3 wherein the nitric acid in the leaching step is a solution of 30 to 67 percent nitric acid.

5. A method according to claim 1 wherein the leaching is followed by heating to a temperature of from about 125° C. to about 200° C. to form a liquid/solid residue in which the nickel, cobalt and magnesium values are in solution, and the iron and manganese values are solid residues in oxide form.

6. A method according to claim 1, wherein precipitation of iron is accomplished by thermal hydrolysis or by pH balancing of the solution.

7. A method according to claim 1 wherein the pH balance to form Ni/Co salts is accomplished by mixing with the nickel- and cobalt-containing solution a compound selected from the group consisting of: an alkaline earth hydroxide, an alkaline earth carbonate, an alkaline earth oxide, an alkali metal hydroxide, and an alkali metal carbonate.

8. A method according to claim 1 wherein the ore is crushed prior to leaching.

9. A method according to claim 1 wherein the ores are sulfides.

10. A method of recovering metal values from ores containing iron, nickel, cobalt, magnesium, and aluminum, comprising:
    a) leaching the ore with nitric acid for a sufficient time to form a slurry;
    b) separating any undissolved residue to form a solution;
    c) precipitating the iron from the solution as $Fe_2O_3 \cdot 3H_2O$;
    d) precipitating aluminum as $Al_2O_3$, and leaving a solution containing nickel and cobalt values;
    e) performing a step from the group consisting of: thermal hydrolysis, pH balance shift and solvent extraction, to form one selected from $Ni(OH)_2$ and $Co(OH)_2$, NiS and CoS, and Ni/Co salts in solid form, and removing the nickel and cobalt, values as a precipitate;
    f) recovering nitric acid and $NO_x$ containing gases from the solution; and
    g) reforming the recovered $NO_x$ containing gases into nitric acid for further use.

11. A method according to claim 10 wherein the leaching is carried out at a temperature of 70° C. to 160° C. for a period of time of from about 30 minutes to about 3 hours.

12. A method according to claim 10 wherein the nitric acid in the leaching is a solution of 10 to 90 percent nitric acid.

13. A method according to claim 12 wherein the nitric acid in the leaching is a solution of 30 to 67 percent nitric acid.

14. A method according to claim 10 wherein the leaching is followed by heating to a temperature of from about 125° C. to about 200° C. to form a liquid/solid residue in which the nickel, cobalt and magnesium values are in solution, and the iron, manganese, and aluminum values are solid residues in oxide form.

15. A method according to claim 10, wherein precipitation of iron is accomplished by thermal hydrolysis, or by pH balancing of the solution.

16. A method according to claim 10 wherein the ore is crushed prior to leaching.

17. A method according to claim 10 wherein the ores are sulfides.

18. A method according to claim 10, further comprising:
after step e), performing thermal hydrolysis, pH balance (pH shift), sulfide precipitation, or solvent extraction to form one selected from $Ni(OH)_2$ and $Co(OH)_2$, NiS and CoS, and Ni/Co salts in solid form, and removing the nickel and cobalt values as a precipitate.

19. A method of recovering metal values from ores containing iron, nickel, cobalt, and magnesium, comprising:
a) leaching the ore with nitric acid for a sufficient time to form a slurry;
b) separating any undissolved residue from the slurry to form a solution:
c) precipitating the iron as $Fe_2O_3.3H_2O$, and leaving a solution containing nickel and cobalt values;
d) performing sulfide precipitation to form NiS and CoS in solid form, and removing the nickel and cobalt values as a precipitate;
e) recovering nitric acid and $NO_x$ containing gases from the solution; and
f) reforming the recovered $NO_x$ containing gases into nitric acid for further use.

* * * * *